(12) United States Patent
Duh et al.

(10) Patent No.: US 6,441,129 B2
(45) Date of Patent: Aug. 27, 2002

(54) HIGH TEMPERATURE SOLID STATE POLYMERIZATION OF POLY (TRIMETHYLENE TEREPHTHALATE)

(75) Inventors: Ben Duh, Tallmadge; Ann Marie Corey, Akron, both of OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/858,171

(22) Filed: May 15, 2001

(51) Int. Cl.[7] .................................................. C08F 6/00
(52) U.S. Cl. ........................ 528/503; 528/302; 528/308; 528/308.6; 528/481
(58) Field of Search ............................. 528/481, 503, 528/302, 308, 308.6

(56) References Cited

U.S. PATENT DOCUMENTS

| | | | |
|---|---|---|---|
| 4,161,578 A | 7/1979 | Herron | 528/272 |
| 4,532,319 A | 7/1985 | Wendling | 528/274 |
| 5,292,865 A | 3/1994 | Kerpes et al. | 528/492 |
| 5,296,587 A | 3/1994 | Sumner, Jr. et al. | 528/281 |
| 5,340,909 A | 8/1994 | Doerr et al. | 528/276 |
| 5,408,035 A | 4/1995 | Duh | 528/480 |
| 5,459,229 A | 10/1995 | Kelsey et al. | 528/275 |
| 5,536,810 A | 7/1996 | Thiele | 528/481 |
| 5,552,513 A | 9/1996 | Bhatia | 528/308.3 |
| 5,599,900 A | 2/1997 | Bhatia | 528/491 |
| 5,663,281 A | 9/1997 | Brugel | 528/272 |
| 5,786,443 A | 7/1998 | Lowe | 528/272 |
| 5,811,496 A | 9/1998 | Iwasyk et al. | 525/444 |
| 5,872,204 A | 2/1999 | Kuo et al. | 528/279 |
| 5,891,985 A | 4/1999 | Brugel | 528/283 |

FOREIGN PATENT DOCUMENTS

| | | |
|---|---|---|
| WO | WO 98/23662 | 6/1998 |
| WO | WO 99/11709 | 11/1999 |

OTHER PUBLICATIONS

"PET SSP: One of the Key Steps in PET Manufacturing," Paper presented in Buhler Pro Tech Forum '96, Uzwil, Switzerland, Jun. 20–21, 1996.

*Primary Examiner*—Samuel A. Acquah
(74) *Attorney, Agent, or Firm*—Donald F. Haas

(57) ABSTRACT

The present invention is a process for producing poly (trimethylene terephthalate) (PTT) at an increased solid state polymerization rate, wherein 1,3-propane diol and an aromatic acid or a dialkyl ester thereof are esterified or transesterified, the esterification or transesterification product is polycondensed, and the polycondensation product is pelletized and then subjected to continuous solid state polymerization at a temperature of 200 to 225° C., preferably 210 to 225° C. In one embodiment of the present invention, the temperature range is 200 to 220° C., and the pellet size of the polymer to be solid state polymerized is from 1.0 to 1.5 g/100. In another embodiment of the present invention, the solid state polymerization is carried out at 210 to 225° C. for from 1 to 20 hours and then the temperature is increased to above the initial melting point of the polymer to produce a PTT polymer with an intrinsic viscosity of 1.3 dl/g or greater.

9 Claims, 3 Drawing Sheets

IV vs. SSP Time Curves for PTT at Various Temperatures

SSP Time Requirement vs. Pellet Size for Prepolymer B at Various SSP Temperatures SSP Time Requirement vs. Pellet Size for Prepolymer A at Various SSP Temperatures though the process is applicable to any 1,3-propanediol based aromatic polyester. PTT is made by an esterification/polycondensation process or a transesterification/polycondensation process.

HIGH TEMPERATURE SOLID STATE POLYMERIZATION OF POLY (TRIMETHYLENE TEREPHTHALATE)

FIELD OF INVENTION

This invention relates to a process for the production of the polyester poly(trimethylene terephthalate) (PTT) from 1,3-propanediol (PDO) and an aromatic acid or a dialkyl ester thereof by melt polymerization followed by solid state polymerization (SSP). More particularly, this invention relates to an improved solid state polymerization step in the production of poly(trimethylene terephthalate).

BACKGROUND OF THE INVENTION

Poly(trimethylene terephthalate) is a new polyester with a unique combination of properties that are particularly suitable for carpet and textile fiber applications The molecular weight of poly(trimethylene terephthalate) required for fiber applications is in between 18,000 and 22,000 which is equivalent to an intrinsic viscosity (IV) between 0.80 and 0.94 dl/g as measured in a 60/40 phenol/tetrachloroethane solvent at 30° C. Up to the present time, it has been found to be very difficult and very expensive to produce PTT with such an IV and good color by melt phase polymerization alone. Thus, it is necessary to use a combined melt/solid state polymerization process to produce high quality PTT for fiber applications.

First a PTT prepolymer with an intermediate IV is produced by melt polymerization. The prepolymer pellets thus produced are further polymerized in solid state to the desired IV. In the case of the much more well known poly(ethylene terephthalate) (PET), a resin with a molecular weight of 20,000 (or an IV of 0.63 dl/g) for textile fiber applications can be produced by melt polymerization alone. However, solid state polymerization has been widely used to produce PET resins with IV's higher than 0.70 dl/g for bottle, food tray, and tire cord applications. Two different solid state polymerization processes have been practiced in the production of high IV PET, continuous and batch processes. The continuous process typically uses a cylindrical reactor wherein polycondensation takes place as the precrystallized and preheated PET pellets move downward from the top to the bottom by gravity while a stream of nitrogen flows upward countercurrently to the polymer flow to sweep away the reaction byproducts. The batch process typically uses a tumbling reactor wherein polymerization takes place under a vacuum. In PET manufacture, it is desirable to conduct solid state polymerization at or close to the maximum safe temperature since the polymerization rate increases with increasing reaction temperature. However, as the temperature increases, the tendency of polymer pellets to agglomerate or stick increases.

Unmodified PET widely used for fiber and food tray applications has a normal DSC melting point ($T_m$) of about 260° C. and a glass transition temperature ($T_g$) of about 74° C. The normal melting point is the peak temperature of the fusion endotherm on the DSC thermogram of the amorphous polymer sample which has zero or minimal crystallinity. This polymer can be solid state polymerized in a continuous moving bed reactor at a maximum average temperature of about 220° C. without sticking or lumping of polymer pellets. This maximum allowable solid state polymerization temperature is about 40° C. below the normal melting point. In a batch process, the maximum safe temperature is 10 to 15 degrees higher because of the tumbling action of the batch reactor. Modified PET widely used for soft drink bottle applications has a normal melting point between 250 and 255° C. and a $T_g$ of about 74° C.

Since the continuous PET solid state polymerization processes are practically the only existing commercial scale solid state processes for polyesters today, according to the conventional wisdom of experts in the field, they are naturally used as the basis for the development and design of solid state polymerization processes for new polyesters. PTT has a normal DSC melting point of about 228° C. and a $T_g$ of about 45° C. According to the above described conventional wisdom in the art, it is generally believed that the maximum allowable solid state polymerization temperature for the solid state polymerization of a polyester is not higher than 35 to 40° C. below its normal melting point. Thus, the conventional wisdom would lead one to the conclusion that the maximum allowable safe reaction temperature for continuous solid state polymerization of PTT would not be higher than about 190° C. for the continuous solid state process and about 207° C. for the batch process. The disadvantage of theses temperatures is that the polymerization rate is relatively slow.

In the present commercial practice, the standard pellet size for PTT melt resins which are introduced into the solid state polymerization step is about 2.5 g/100. This was also the standard pellet size for some producers of PET bottle resins for many years. Other producers of PET bottle resins use pellet sizes between 1.8 and 3.0 g/100.

The present invention provides a solid state polymerization process which allows a significant rate increase over the current commercial practice and what is expected according to the conventional wisdom in the art.

SUMMARY OF THE INVENTION

The present invention is a process for producing poly (trimethylene terephthalate) (PTT) at an increased solid state polymerization rate, wherein 1,3-propanediol and an aromatic acid or a dialkyl ester thereof are esterified or transesterified, the esterification or transesterification product is polycondensed, and the polycondensation product is pelletized and then subjected to continuous solid state polymerization at a temperature of 200 to 225° C., preferably 210 to 225° C. In a second embodiment, the solid state polymerization is carried out in batch fashion at a temperature of 210 to 225° C. In another embodiment of the present invention, the temperature range is 200 to 220° C. for a continuous process and 210 to 220° C. if it is carried out in batch, and the pellet size of the polymer to be solid state polymerized is from 1.0 to 1.5 g/100. In still another embodiment of the present invention, the solid state polymerization, batch or continuous, is carried out at 210 to 225° C. for from 1 to 20 hours and then the temperature is increased to above the normal melting point of the prepolymer to produce a PTT polymer with an intrinsic viscosity of 1.3 dl/g or higher.

DETAILED DESCRIPTION OF THE INVENTION

Figure 1:
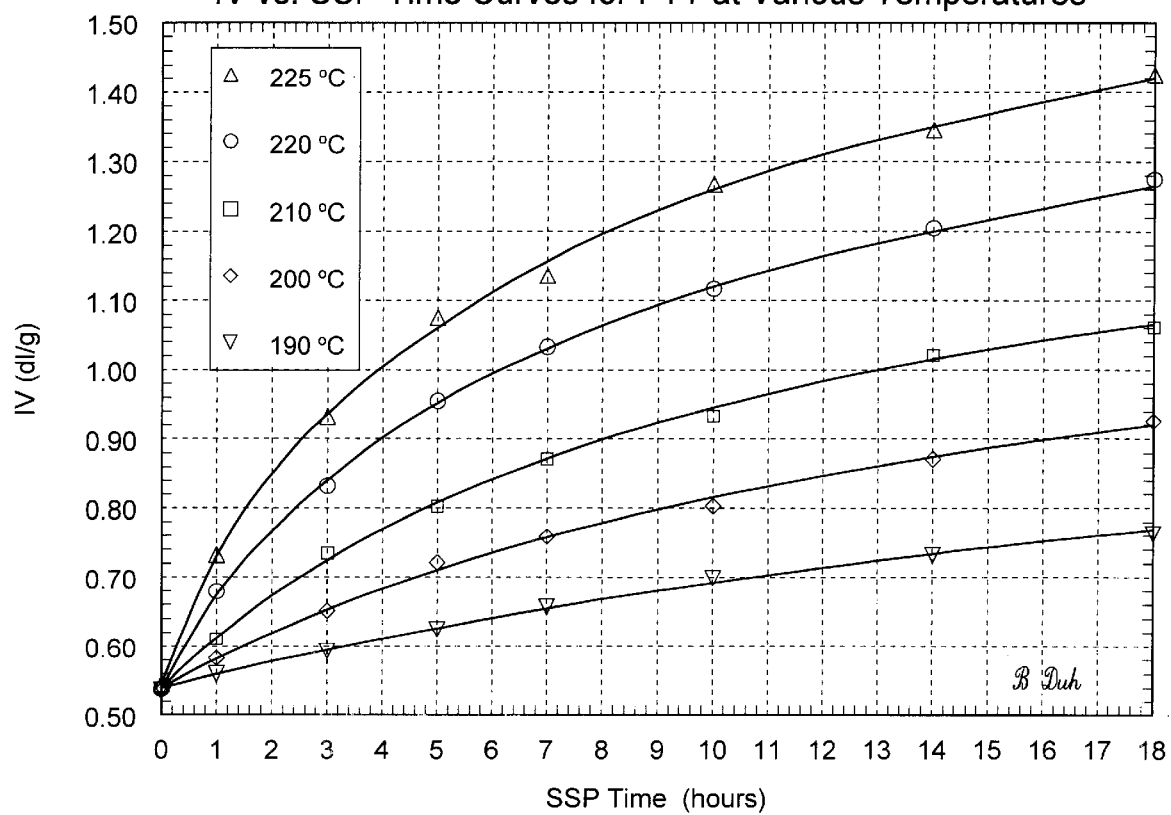
FIG. 1 is a plot of intrinsic viscosity versus solid state polymerization time for PTT at various temperatures.

This process produces a 1,3-propanediol-based aromatic polyester, specifically poly(trimethylene terephthalate)

(PTT). This refers to a polyester prepared by reacting 1,3-propanediol with at least one aromatic diacid or alkyl ester thereof. Preferably, the reactant diacid or alkyl ester is terephthalic acid (TPA) or dimethyl terephthalate (DMT).

As used herein, "1,3-propanediol-based aromatic polyester" refers to a polyester prepared by the condensation polymerization reaction of one or more diols with one or more aromatic diacids or alkyl esters thereof (herein referred to collectively as "diacid") in which at least 80 mole percent of the diol(s) is 1,3-propanediol. "Poly(trimethylene terephthalate)" refers to such a polyester in which at least about 80 mole percent of the diacid(s) is terephthalic acid. Other diols which may be copolymerized in such a polyester include, for example, ethylene glycol, diethylene glycol, 1,4-cyclohexane dimethanol, and 1,4-butanediol; and other aromatic and aliphatic acids which may be copolymerized include, for example, isophthalic acid and 2,6-naphthalane dicarboxylic acid. The poly(trimethylene terephthalate) may contain additives (such as stabilizer, toner, and dye), and delustrant, etc., added during the melt polycondensation stage to impart the desired properties. Most poly (trimethylene terephthalate) products for fiber applications contain up to several weight percent titanium dioxide delustrant.

Numerous processes are known to prepare polyesters. Such processes may be batchwise or continuous and may employ one or multiples stages. In general, such processes have in common the reaction at elevated temperature of a diol and an aromatic diacid or alkyl ester thereof, with the removal of byproduct water or alcohol, for a time effective to produce a polyester having an intrinsic viscosity (IV) suitable for the desired application.

In this invention, the poly(trimethylene terephthalate) polyester is prepared in a two-stage condensation polymerization process. The first stage is melt polycondensation and the second stage is solid state polycondensation. Depending on the precursors used, there are two melt polycondensation processes, namely the TPA process and the DMT process. Each melt polycondensation process comprises two steps. While the first steps are different, the second steps are similar.

The first step of the TPA process is an esterification step wherein a molar excess of at least one diol, specifically 1,3-propanediol, is reacted with at least one diacid, specifically TPA, usually in the absence of added catalyst, at temperatures within the range of about 230 to 270° C. under a super-atmospheric pressure within the range of about 30 to about 80 psia. The esterification product is a mixture of oligomers of bis(3-hydroxy propyl) terephthalate (BHPT), with a degree of polymerization of 3 to 10, if PDO is the only diol and TPA is the only diacid used. During esterification, byproduct water is continuously removed from the reactor.

The first step of the DMT process is a transesterification step, wherein at least one diol, specifically PDO, is reacted with at least one alkyl ester of a diacid, specifically DMT, in the presence of a suitable transesterification catalyst such as zinc acetate, magnesium acetate, or titanium alkanoate, at temperatures within the range of about 180 to about 250° C. under near atmospheric pressure. The transesterification product is also a mixture of the oligomers of BHPT if PDO is the only diol and DMT is the only diester used. The transesterification generates alcohol as the byproduct which is continuously distilled off.

The second step of melt polymerization is the polycondensation step, wherein the pressure on the reaction mixture is reduced and a catalyst is added. The preferred polycondensation catalysts are compounds of titanium, antimony, or tin, such as titanium butoxide, present in an amount within the range of 10 to 400 ppm titanium, antimony, or tin, based on the weight of the polymer. The low molecular weight product of the esterification or transesterification step is heated in this polycondensation step at a temperature within the range of about 240 to 300° C. under a vacuum for a time sufficient to increase the IV of the starting material to at least about 0.25 dl/g, while the major byproduct of polycondensation, PDO, is removed.

The product of the previous step is pelletized, using a strand pelletizer, an underwater pelletizer, or a drop-forming device, and then transferred to a solid state polymerization section in order to further polymerize the polymer to increase the intrinsic viscosity to the desired level, usually in the range of 0.80 to 0.94 dl/g, which is required for fiber applications. The relatively low IV polymer produced by a melt polymerization process and intended to be further polymerized in solid state is referred to as the prepolymer.

A combination of melt polymerization and solid state polymerization processes has been preferred over a melt polymerization process alone for the production of PTT for fiber applications for reasons of process economics and product quality. Although PTT and PET have similar properties, in general, PTT is substantially less stable and therefore more susceptible to thermal degradation than PET during the melt polycondensation step. To limit degradation of PTT, a melt polycondensation temperature at least 30° C. lower than that for the production of PET has to be used. Consequently, a polycondensation time several times longer than for PET and a disk ring type polycondensation reactor several times larger than for PET are required for PTT. This leads to a very expensive process if a melt polymerization process alone is to be used to produce PTT for fiber applications. Furthermore, even with such a lower polycondensation temperature, the long residence time required to achieve the desired IV will result in inferior product properties, especially color. By terminating melt polymerization earlier, to limit thermal degradation, and further polymerizing the melt polycondensation product in solid state at a much lower temperature to the IV suitable for the desired application, better overall process economics and better product quality, especially in terms of color, can be achieved.

The solid state polymerization may be carried out in a similar manner as has been used for PET such as described in U.S. Pat. Nos. 4,161,578 and 5,408,035, which are herein incorporated by reference, and in "PET SSP: One of the Key Steps in PET Manufacturing," presented in Pro Tech Forum '96, Jun. 20–21, 1996, sponsored by Buhler Limited, Uzwil, Switzerland. As described in these references, the standard continuous PET solid state polymerization process can be broken down into five steps, crystallization, drying/annealing, preheating, solid state polymerization, and product cooling. The solid state polymerization of PTT is carried out in generally the same manner.

First, amorphous PTT prepolymer pellets are crystallized in a crystallizer wherein they are heated from ambient temperature to a temperature in the range of 100 to 170° C. for 5 to 30 minutes, depending on the type of crystallizer used, to develop a crystallinity of 40 percent or higher. During this step, the polymer becomes sticky so special handling means, such as vigorous agitation, are necessary.

The crystallized pellets are fed into the drying/annealing vessel which can be a simple hopper-type vessel. The polymer pellets move downward through the vessel by gravity while a stream of purge gas, which may be air or nitrogen, flows upward through the vessel. Within this vessel, the polymer continues to crystallize while its moisture content is reduced to below about 0.01 percent by weight to prevent hydrolytic degradation during the subsequent preheating step. The residence time in this vessel is typically between 30 minutes and several hours.

The dried, annealed polymer pellets then enter the preheater wherein the polymer temperature is raised to a temperature high enough to cause solid state polymerization at a sufficiently fast rate but not high enough to cause polymer sticking inside the solid state polymerization reactor. Thus, for PTT, during the preheating step, the polymer is heated to the reaction temperature within 3 to 60 minutes, depending on the type of preheater used.

The preheated polymer pellets then enter the solid state reactor. In a continuous process, this generally is a vertical cylindrical reaction vessel which can be six to twelve feet in diameter and 30 to 80 feet in height with a hot oil jacket or heavy insulation to minimize heat loss through the reactor wall. Inside the reactor, solid state polymerization takes place as the polymer pellets move downward by gravity while a stream of nitrogen, usually preheated to the polymer temperature, flows upward and countercurrently to the polymer flow to sweep away the reaction byproducts which may be PDO, water, and acrolein, etc. The desired intrinsic viscosity is achieved when the polymer pellets exit the bottom of the reactor. In the present invention, it is essential that the temperature within the continuous solid state polymerization reactor range from 200 to 225° C., preferably 210 to 225° C. For a batch process, the temperature range is 210 to 225° C. Surprisingly, the PTT polymer pellets do not stick during polymerization in this temperature range although the maximum safe reactor temperature is generally believed to be no higher than 190° C. (for a continuous process; about 207° C. for a batch process) according to the conventional wisdom derived from vast experience with the continuous solid state polymerization processes of PET. By using these unexpectedly high safe SSP temperatures for PTT, the polymerization rate is dramatically increased, i.e., by 100 to 1000 percent.

The solid state polymerization product leaving the bottom of the reactor is then cooled in the product cooler. This is usually a fluid bed cooler and the temperature of the pellets is lowered to below 65° C. so that it can be packaged, stored, and/or shipped.

In a preferred embodiment of the present invention, the PTT pellets formed at the end of the melt polymerization which are to be solid state polymerized have a pellet size in the range of 1.0 to 1.5 g/100. We have found that operating within this lower pellet size range for PTT, the rate of solid state polymerization is dramatically increased, i.e., from 30 to 50 percent, over the rate which can be achieved with the currently commercially used standard PTT pellet size of 2.5 g/100. Decreasing the pellet size of PET pellets does have a positive effect on the solid state polymerization rate but this effect is much less, i.e., only 15 to 25 percent. We have unexpectedly found that PTT with these small pellet sizes can be solid state polymerized within the same range used for PTT, preferably 210 to 220° C. for both batch and continuous, with normal pellet sizes without sticking. This is surprising in view of the fact that, in order to prevent sticking, PET with these small pellet sizes must be solid state polymerized at substantially lower temperatures than the maximum safe temperature for PET with normal pellet sizes.

In another preferred embodiment of the present invention, the solid state polymerization of the PTT pellets is carried out at 210 to 225° C. for 1 to 20 hours. During this period of time, a morphological transformation takes place in the PTT. As the result of this transformation, the melting point of the PTT prepolymer is increased to a temperature above the normal melting point of PTT prepolymer (i.e., 228° C.) and the crystallinity is also increased substantially. Then the solid state polymerization temperature is raised above the normal melting point, preferably by at least about 2° C. to increase the solid state polymerization rate, most preferably up to a range of 230 to 240° C. Since the melting point has been raised, polymer sticking does not occur. This method is particularly useful in the production of a very high IV polymer with a normal IV (i.e., 0.50 to 0.70 dl/g) prepolymer. Intrinsic viscosities of 1.3 dl/g or greater can be achieved using this method. Such polymers are required for applications such as monofilament for paper making screens and some engineering plastic applications. Alternately, this method can be used to produce fiber grade polymer (with IV in the range of 0.80 to 0.94) with a very low IV (i.e., 0.25 to 0.50 dl/g) prepolymer.

EXAMPLES

Example 1 (Comparative)

According to plant operation experience with continuous solid state polymerization (SSP) of a modified PET with an IV of 0.590 dl/g, a normal melting temperature of 253.5° C., a $T_g$ of 74° C., and a pellet size of 2.55 g/100, the maximum allowable reaction temperature for the production of a bottle resin of 0.84 dl/g is about 215° C. This PET resin was solid stated in a small-scale SSP reactor made from a 24-inch long glass tube with about 1.25 inch internal diameter. This reactor tube had a cone-shaped bottom which was connected to a small purge-gas supply tube which in turn coiled up around the reactor. The only purge gas used was nitrogen. The reactor with its purge-gas supply tube was immersed in the thermostated oil bath that heated the reactor content as well as the incoming nitrogen.

Initially, the oil temperature was controlled at 175° C. About 100 grams of PET pellets was charged into the reactor and a stream of nitrogen, sufficient to fluidize the PET pellets in the reactor, was passed through the reactor to simulate the crystallization step which lasted 15 minutes. The immersed length of the nitrogen supply tube was sufficient to heat the incoming nitrogen to within 0.25° C. of the oil temperature as it enters the bottom of the reactor. However, because of the restriction of the small reactor diameter, it was necessary to agitate the pellets with a metal rod to prevent or minimize pellet sticking. After the crystallization step, the nitrogen flow was reduced to 18 standard cubic feet per hour (SCFH) to maintain a static bed and the oil temperature was maintained at 175° C. for another hour to simulate the drying/annealing step. Then the oil temperature was quickly raised to 215° C. and the nitrogen was again increased to fluidize the PET pellets to simulate the preheating step which lasted 15 minutes. Again, agitation with the metal rod was necessary to prevent sticking. After the preheating step, the nitrogen was again reduced to 18 SCFH to maintain a static bed and to start the solid state polycondensation step which lasted 17 hours. Samples were taken with a suction tube at various intervals throughout the SSP period. Except for the 0 hour sample, the bed had to be loosened by poking the bed with a pointed metal rod before sampling because the PET pellets stuck to the reactor wall and lumped together after 1 hour into the SSP step. This was not surprising because, under the SSP conditions, PET is somewhat tacky because it is only partially crystalline. After a prolonged period of contact with one another at the same surfaces, PET pellets, under their own weight, can creep into one another and stick together. A moving bed can prevent pellet sticking because the continuous movement not only reduces the pellet contact area but also constantly changes the contact area.

Each sample taken during the SSP was tested for IV and scanned on the differential scanning calorimeter (DSC). Table 1 lists the IV, and some DSC data, including the fusion peak temperatures (Tm1 and Tm2), average melting point (Tma), and the total percent crystallinity. The average melting point is determined as the temperature at which 50% of the total fusion heat is evolved during the DSC scan. The percent crystallinity was calculated from the total heat of fusion using 140 joules/g of heat of fusion for 100% crystallinity. Absence of fusion peak temperature value for Tm1 (indicated by a short dash line) means that there was only one distinguishable peak temperature for the two fusion peaks had sufficiently merged. From the IV data, the SSP time required for PET to attain the product IV of 0.84 dl/g at 215° C. was determined to be about 11 hours. It can be seen from the peak temperature data that it took between 9 and 13 hours for the two PET melting peaks to merge at 215° C.

Examples 2–6

A PTT prepolymer with an IV of 0.540 dl/g, a normal melting temperature of 228° C., a $T_g$ of 45° C., and a pellet size of 1.92 g/100 was used in the SSP experiments for Examples 2 through 6. The experimental procedure and conditions of Examples 2–6 were similar to those for the experiment in Example 1, except the SSP temperatures for Examples 2, 3, 4, 5, and 6 were 190, 200, 210, 220, and 2250° C. respectively. The SSP steps of these experiments lasted up to 22 hours. Samples were taken with a suction tube at various intervals during the SSP step of each of these experiments. It was surprisingly noticed that, throughout the entire SSP periods of all of these experiments, PTT pellets in the reactor could be readily removed with the suction tube without poking the bed with the metal rod before sampling. This indicated that the PTT pellets in the stationary bed in each of these experiments were distinctly less sticky than the PET pellets in the experiment for Example 1. Since PET can be solid stated in a continuous moving bed reactor at 215° C. without sticking, these experiments also indicate that PTT can be solid stated in a continuous moving bed reactor at temperatures between 190 and 225° C. without sticking.

The samples taken during the SSP of these experiments were also tested for IV and scanned on DSC. Since the heat of fusion for 100% crystalline PTT has been reported to be very close to that for 100% crystalline PET, the percent crystallinity of each of the solid stated PTT samples was calculated using 140 joules/g of heat of fusion for 100% crystalline PTT. The IV and DSC data obtained for the samples taken during these experiments are also included in Table 1.

From the data in Table 1, it can be seen that PTT attains substantially higher crystallinity during SSP at temperatures between 190 and 225° C. At an SSP temperature of 190° C., it took longer for the two DSC fusion peaks of PTT to merge than for that of PET at 215° C. However, the PTT fusion peaks were much sharper than the corresponding PET fusion peaks. At SSP temperatures of 200 and 210° C., the PTT fusing peaks merged after less than 10 hours and 3 hours, respectively, of SSP. For the SSP runs with 220 and 225° C. SSP temperatures, the PTT fusion peaks had merged when the polymer was preheated to the SSP temperature. Also it can be seen that the average melting point of PTT increases to above its normal melting point (228° C.) after 5 hours of SSP at 210° C. (referring to Example 4) and before it was preheated to 220° C. (referring to Example 5) and 225° C. (referring to Example 6). Furthermore, the crystallinity of the polymer increases continuously throughout the whole length of each SSP run. The fast morphological transformation of PTT at temperatures higher than 200° C. is responsible for the low sticking tendency of PTT (relative to PET) at these relatively high SSP temperatures.

The IV data for Examples 2–6 were plotted against the SSP time in FIG. 1. From the SSP curves in this figure, the SSP time required to achieve the product IV of 0.90 dl/g was obtained. It can be seen that PTT solid state polymerized very slowly at 190° C. By extrapolation, the SSP time required for PTT to attain 0.90 dl/g IV at 190° C. was estimated to be about 35 hours. The SSP times required at 200, 210, 220, and 225° C. were determined to be 16.2, 8.0, 4.0, and 2.6 hours respectively. It can be seen that, at 210° C. or higher temperatures, very fast SSP can be achieved. From these SSP time requirement data, it is estimated that the average SSP rate of PTT about doubles with each 10° C. increase in temperature. For comparison, we have determined the SSP rate of PET increases by 75% with each 10° C. increase in temperature. Apparently, temperature has a much greater effect on the SSP rate of PTT and the ability to solid state PTT at relatively high temperatures is very beneficial.

Example 7

It has been noted in Examples 2 through 6 that PTT pellets were distinctively less sticky during SSP at temperatures between 190 and 225° C. than PET pellets during SSP at 215° C. This example provides another way to compare the sticking tendency of PTT during SSP at 190, 200, 210, 220, and 225° C. with that of PET at 215° C.

The experiments were practically the duplicates of the experiments for Examples 1–6 except no samples were taken during the SSP steps and the SSP steps were terminated when the desired product IV (0.84 dl/g for PET and 0.90 dl/g for PTT) was estimated to be attained. Thus, PET prepolymer and 11 hours of SSP time were used in the first experiment. PTT prepolymer were used in the other five experiments with SSP temperatures of 190, 200, 210, 220, and 225° C., and SSP times of 35, 16.2, 8.0, 4.0, and 2.6 hours respectively. The height of the polymer bed in each of these experiments remained unchanged at about 6 inches throughout the SSP step. At the end of the SSP step, the reactor was removed from the oil bath and immediately inverted to try to pour the pellets out of the reactor. From the amount of the pellets poured out of the reactor or the ease (or difficulty) the pellets were removed from the reactor, the relative pellet sticking tendencies during SSP were determined.

In the first experiment with PET prepolymer, only a few of the PET pellets on the top of the bed were poured out. The remaining PET pellets stuck together and to the reactor wall at the end of SSP. It was necessary to chisel the bed to break it into small lumps with a pointed metal rod and dislodge the polymer from the reactor. In the 3 experiments with PTT pellets solid stated at 190, 200, 210° C., practically all the PTT pellets remained loose and all but a few pellets near the reactor bottom were poured out without effort. In the 2 experiments with PTT pellets solid stated at 220 and 225° C., about 3.2 and 2.5 inches, respectively, of the polymer beds remained loose and were poured out. By gently stirring with a metal rod, the remaining lightly stuck pellets in both of these two experiments were easily loosened up and dropped out of the reactor. These observations indicate that PTT has markedly less sticking tendencies in the SSP reactor at temperature as high as 225° C. than PET at 215° C.

Example 8

The same PTT prepolymer used in Examples 2–6 was used in this example. The crystallization, drying/annealing, and preheating steps used in this example were similar to those used in Example 5. The PTT pellets were first solid state polymerized at 220° C. for 10 hours without taking any sample. Then the reactor temperature was raised to 230° C. (2° C. above the normal Tm) over 15 minutes during which the nitrogen flow was momentarily increased sufficiently to fluidize the bed. Then the SSP was continued at 230° C. in the static bed for another 10 hours during which samples were taken at various intervals. The IV and DSC data for the samples taken in this experiment are also included in Table 1. Again, as in the previous PTT SSP runs, it was not necessary to stir the bed before each sampling with a suction tube. This indicates that PTT can be solid state polymerized in a two-stage continuous SSP process, with SSP temperatures of 220 and 230° C. respectively for the first and the second stages, to produce 1.64 IV product without pellet sticking. Note that the melting point of PTT at the end of this SSP run approached 243° C., indicating that the SSP temperature could have been further increased (to 235° C., for example) at this point, to further increase the reaction rate, if the SSP had been continued. Thus, it is possible to produce very high IV PTT by a multistage SSP process using progressively higher reaction temperatures for the subsequent stages.

TABLE 1

| Example | SSP Temp., ° C. | SSP Time, Hrs. | IV, dl/g | % Crystallinity | Tm2, ° C. | Tm1, ° C. | Tma, ° C. |
|---|---|---|---|---|---|---|---|
| 1 | 215 | 0 | 0.582 | 32.4 | 220.2 | 252.4 | 248.1 |
|   |     | 1.5 | 0.625 | 38.5 | 229.6 | 250.7 | 245.7 |
|   |     | 3.5 | 0.681 | 39.9 | 233.3 | 250.4 | 243.0 |
|   |     | 6.0 | 0.746 | 40.7 | 237.3 | 250.1 | 240.0 |
|   |     | 9.0 | 0.805 | 41.4 | 239.0 | 249.7 | 240.0 |
|   |     | 13.0 | 0.875 | 42.9 | 240.7 | — | 241.4 |
|   |     | 17.0 | 0.923 | 44.0 | 242.4 | — | 242.5 |
| 2 | 190 | 0 | 0.537 | 43.3 | 196.9 | 230.8 | 227.1 |
|   |     | 1.0 | 0.560 | 44.8 | 204.0 | 230.5 | 226.4 |
|   |     | 3.0 | 0.593 | 46.1 | 206.7 | 230.0 | 225.9 |
|   |     | 5.0 | 0.625 | 49.5 | 210.8 | 230.1 | 225.5 |
|   |     | 7.0 | 0.657 | 49.7 | 213.7 | 229.7 | 225.0 |
|   |     | 10.0 | 0.699 | 51.7 | 216.6 | 230.9 | 224.8 |
|   |     | 14.0 | 0.732 | 52.3 | 217.8 | 229.4 | 222.5 |
|   |     | 18.0 | 0.763 | 52.5 | 219.1 | 229.4 | 223.4 |
|   |     | 22.0 | 0.799 | 52.6 | 220.9 | 229.8 | 224.0 |
| 3 | 200 | 0 | 0.536 | 45.6 | 209.2 | 230.3 | 226.1 |
|   |     | 1.0 | 0.582 | 50.5 | 215.6 | 230.4 | 225.9 |
|   |     | 3.0 | 0.651 | 53.2 | 217.3 | 230.0 | 224.4 |
|   |     | 5.0 | 0.721 | 57.2 | 219.7 | 229.2 | 223.3 |
|   |     | 7.0 | 0.758 | 59.3 | 222.5 | 228.8 | 224.0 |
|   |     | 10.0 | 0.802 | 60.2 | 223.9 | — | 224.1 |
|   |     | 14.0 | 0.871 | 61.4 | 225.8 | — | 225.2 |
|   |     | 18.0 | 0.926 | 63.0 | 226.9 | — | 226.4 |
| 4 | 210 | 0 | 0.539 | 48.4 | 219.9 | 230.5 | 226.4 |
|   |     | 1.0 | 0.611 | 54.5 | 221.0 | 229.7 | 224.0 |
|   |     | 3.0 | 0.735 | 59.4 | 227.5 | — | 227.3 |
|   |     | 5.0 | 0.802 | 61.6 | 231.1 | — | 228.7 |
|   |     | 7.0 | 0.871 | 60.0 | 230.0 | — | 229.0 |
|   |     | 10.0 | 0.933 | 61.7 | 231.5 | — | 231.1 |
|   |     | 14.0 | 1.021 | 59.9 | 233.5 | — | 231.9 |
|   |     | 18.0 | 1.061 | 63.5 | 234.2 | — | 232.5 |
| 5 | 220 | 0 | 0.538 | 43.9 | 231.2 | — | 229.4 |
|   |     | 1.0 | 0.679 | 53.5 | 232.1 | — | 230.7 |
|   |     | 3.0 | 0.832 | 57.8 | 234.7 | — | 233.6 |
|   |     | 5.0 | 0.955 | 60.4 | 236.9 | — | 235.9 |
|   |     | 7.0 | 1.033 | 56.6 | 237.9 | — | 237.4 |
|   |     | 10.0 | 1.117 | 57.6 | 239.2 | — | 238.2 |
|   |     | 14.0 | 1.236 | 58.5 | 240.9 | — | 239.1 |
|   |     | 18.0 | 1.275 | 59.5 | 241.5 | — | 240.0 |
| 6 | 225 | 0 | 0.545 | 51.4 | 233.7 | — | 231.8 |
|   |     | 1.0 | 0.732 | 52.1 | 235.1 | — | 234.7 |
|   |     | 3.0 | 0.932 | 53.1 | 238.6 | — | 235.7 |
|   |     | 5.0 | 1.075 | 53.7 | 230.2 | — | 237.5 |
|   |     | 7.0 | 1.136 | 54.1 | 240.5 | — | 238.9 |
|   |     | 10.0 | 1.267 | 54.3 | 242.3 | — | 239.6 |
|   |     | 14.0 | 1.345 | 55.1 | 242.8 | — | 241.6 |
|   |     | 18.0 | 1.425 | 56.5 | 244.3 | — | 242.7 |
| 8 | 230* | 10.25 | 1.124 | 52.4 | 238.9 | — | 237.1 |
|   |     | 12.25 | 1.235 | 53.0 | 241.3 | — | 239.3 |
|   |     | 14.25 | 1.374 | 53.8 | 242.5 | — | 240.5 |
|   |     | 18.25 | 1.517 | 54.3 | 243.9 | — | 242.0 |
|   |     | 20.25 | 1.640 | 55.2 | 244.4 | — | 242.9 |

*Note:
First 10 hours of SSP was conducted at 220° C.

Example 9

Two polymers produced by melt polycondensation were used in this example. Polymer A had an intrinsic viscosity of 0.657 dl/g and Polymer B had an intrinsic viscosity of 0.550 dl/g. These two melt polymers were dried in a vacuum drying apparatus at 140° C. overnight and then repelletized to prepare prepolymers with various pellet sizes for use in the SSP experiment below. To ensure a stable, uniform melt strand from the extruder, low temperature settings (i.e., 250 to 255° C.) were used. As a result, uniform pellets with clean cut faces were obtained. After repelletization, the intrinsic viscosities of the polymer changed slightly to 0.666 and 0.560 dl/g, respectively. The pellet sizes selected for the SSP experiments were 1.22, 1.50, 2.04, 2.50, 2.90, and 4.10 g/100 for the 0.56 IV prepolymers (Polymer B) and 1.44, 1.90, and 2.50 g/100 for the 0.66 IV prepolymers (Polymer A).

Two identical small scale lab SSP apparatuses, similar to that used in the experiment of Example 1, were used to conduct SSP experiments with the repelletized prepolymers. For each SSP run, the prepolymer pellets were first crystallized and dried at 170° C. for 60 minutes. Then the reactor temperature was raised to the desired SSP temperature, generally within a range from 200 to 220° C., over a period of 10 minutes to begin SSP which usually lasted for 22 hours. At all times, a stream of nitrogen was passed through the reactor at a flow rate of 16 SCFH. Samples were taken at various intervals throughout the SSP run for IV tests.

The Polymer B prepolymers with pellet sizes of 1.50, 2.04, 2.50, and 2.90 g/100 and the Polymer A prepolymers with pellet sizes of 1.44, 1.90, and 2.50 g/100 were solid stated at 200, 210, and 220° C. The Polymer B prepolymers with pellet sizes of 1.22 and 4.10 g/100 were solid stated at 210° C. only. The Polymer A and Polymer B prepolymers with pellet size of 2.50 g/100 were also solid stated at 190° C.

The SSP time requirements for the various prepolymers to reach an IV of 0.92 dl/g, as determined from the IV data for the samples taken during the SSP runs, are shown in Table 2.

TABLE 2

| Prepolymers | | SSP Temperature (° C.) | | | |
|---|---|---|---|---|---|
| IV (dl/g) | Pellet Size (g/100) | 190 Hours | 200 Hours | 210 Hours | 220 Hours |
| 0.560 | 1.22 | | | 5.2 | |
| | 1.50 | | 11.3 | 5.7 | 2.9 |
| | 2.04 | | 13.3 | 6.6 | 3.4 |
| | 2.50 | 35.0 | 15.0 | 7.5 | 3.9 |
| | 2.90 | | 17.0 | 8.3 | 4.3 |
| | 4.10 | | | 9.7 | |
| 0.666 | 1.44 | | 5.4 | 2.7 | 1.4 |
| | 1.90 | | 6.2 | 3.1 | 1.6 |
| | 2.50 | 17.0 | 7.2 | 3.6 | 1.9 |

Figure 2:
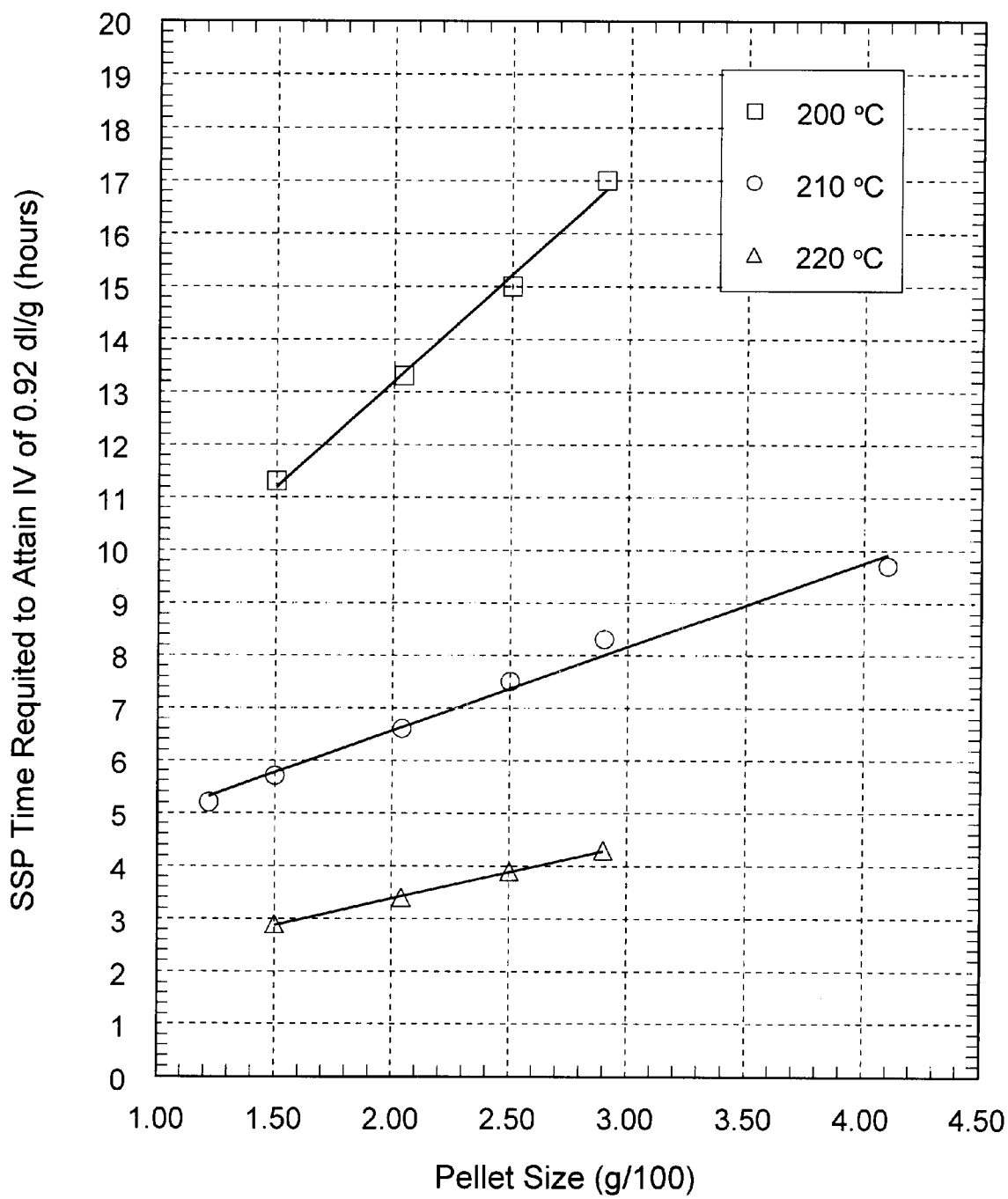
FIG. 2 is a plot of the reaction time required to attain an IV of 0.92 dl/g versus pellet size for Prepolymer B in Example 9.
Figure 3:
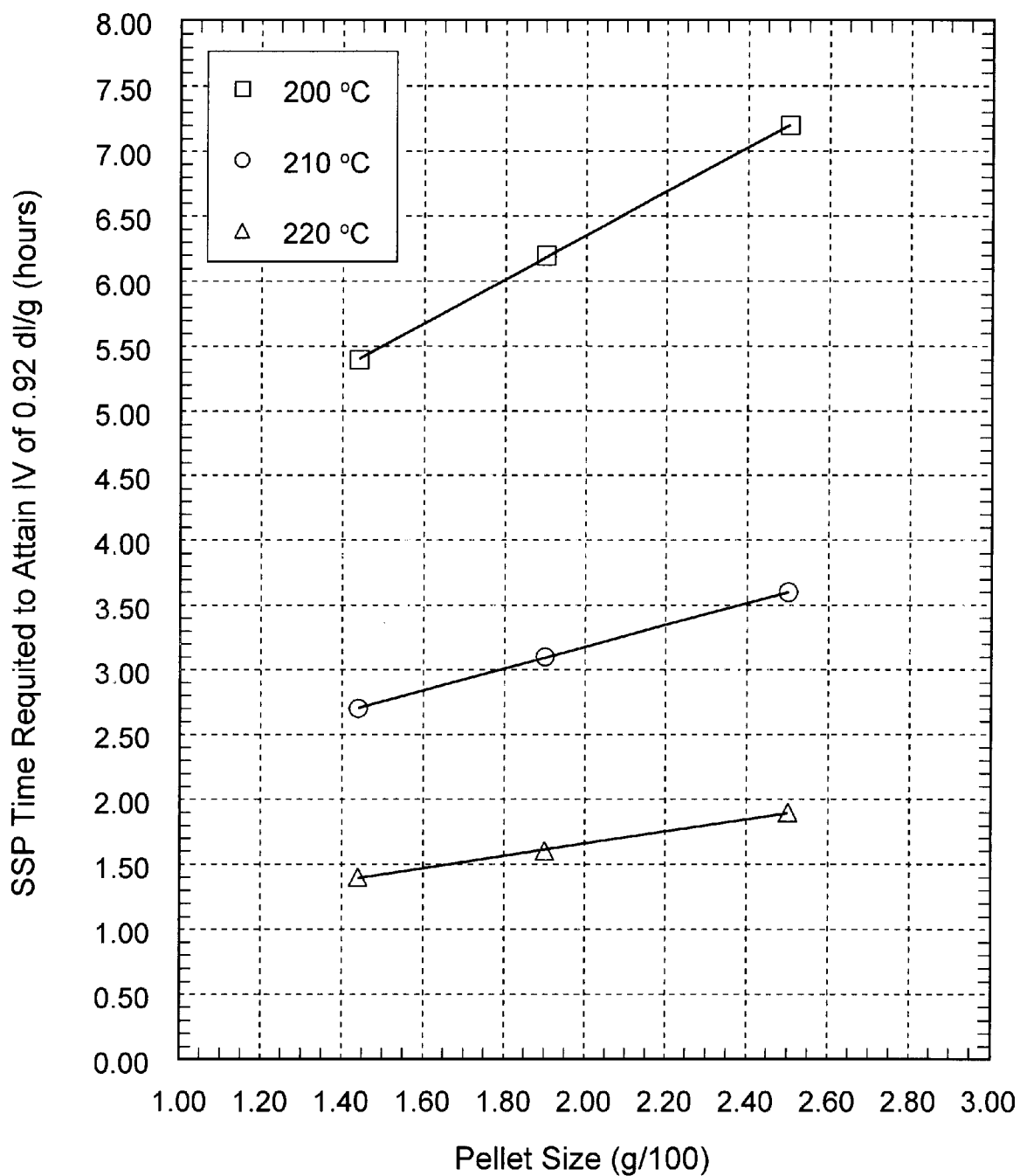
FIG. 3 is a plot of the reaction time required to attain an IV of 0.92 dl/g versus pellet size for Prepolymer A in Example 9.

In FIGS. 2 and 3, the SSP time requirements are plotted against the pellet size with the SSP temperature as a parameter for Prepolymers B and A, respectively. It can be seen that at 200, 210, and 220° C., the SSP time required to achieve 0.92 dl/g IV increases linearly with increasing pellet size for the Polymer B prepolymers within the pellet size range of 1.50 to 2.90 g/100 and for the Polymer A prepolymers within the pellet size range of 1.44 to 2.50 g/100. The slopes of the straight lines in FIGS. 2 and 3 increase with increasing SSP temperature, indicating that the absolute effects of the pellet size are greater at higher temperature.

It can be seen from Table 2 that the prepolymers with pellet size below 1.50 attain a product IV of 0.92 dl/g in the shortest amount of time. This results in a greater than 30 percent increase in the SSP rate over that for the pellet size used in the present commercial practice. This SSP rate increase is about twice as great as that which occurs in commercial PET practice. This appears to be caused by the fact that the SSP of PTT is more diffusion controlled than the SSP of PET and therefore, pellet size will have a stronger effect on the SSP rate of PTT. It is believed that the reasons for this include: (1) PDO, the major reaction byproduct in the SSP of PTT, is a bigger molecule with lower diffusivity than ethylene glycol (EG), the major reaction byproduct in the SSP of PET; and (2) PTT solid state polymerizes about twice as fast as PET at a fixed temperature.

We claim:

1. A process for producing poly(trimethylene terephthalate) and achieving an increased solid state polymerization rate wherein 1,3-propanediol, and optionally other diols, and an aromatic acid or diester thereof are esterified or transesterified, the esterification or transesterification product is polycondensed to produce a prepolymer, and the prepolymer is subjected to continuous solid state polymerization at a temperature of 210 to 225° C. and then at a temperature above the normal melting point of the prepolymer for 1 to 20 hours to produce a polymer with an intrinsic viscosity of 1.3 d/g or greater using a prepolymer with an intrinsic viscosity from 0.50 to 0.70 dl/g.

2. The process of claim 1 wherein the prepolymer is polymerized at 210 to 225° C. for 1 to 10 hours and then polymerized above the normal melting point of the prepolymer for 1 to 10 hours.

3. A process for producing poly(trimethylene terephthalate) and achieving an increased solid state polymerization rate wherein 1,3-propanediol, and optionally other diols, and an aromatic acid or diester thereof are esterified or transesterified, the esterification or transesterification product is polycondensed to produce a prepolymer, and the prepolymer is subjected to batch solid state polymerization at a temperature of 210 to 225° C. and then at a temperature above the normal melting point of the prepolymer for 1 to 20 hours to produce a polymer with an intrinsic viscosity of 1.3 dl/g or greater using a prepolymer with an intrinsic viscosity from 0.50 to 0.70 dl/g.

4. The process of claim 3 wherein the prepolymer is polymerized at 210 to 225° C. for 1 to 10 hours and then polymerized above the normal melting point of the prepolymer for 1 to 10 hours.

5. The process of claim 1, wherein the solid state polymerization temperature is raised at least 2° C. above the normal melting point of the prepolymer.

6. The process of claim 1 wherein the poly(trimethylene terephthalate) is a copolymer in which at least 80 mole percent of the diols is comprised of 1,3-propanediol and at least 80 mole percent of the aromatic acids or diesters is comprised of terephthalic acid or dimethyl terephthalate.

7. The process of claim 3 wherein the solid state polymerization temperature is raised at least 2° C. above the normal melting point of the prepolymer.

8. The process of claim 3 wherein the temperature of solid state polymerization is 210 to 220° C. and the pellet size of the prepolymer entering the solid state polymerization step is 1.0 to 1.5 g/100.

9. The process of claim 3 wherein the poly(trimethylene terephthalate) is a copolymer in which at least 80 mole percent of the diols is comprised of 1,3-propanediol and at least 80 mole percent of the aromatic acids or diesters is comprised of terephthalic acid or dimethyl terephthalate.

* * * * *